(12) United States Patent
Holma et al.

(10) Patent No.: US 7,058,028 B1
(45) Date of Patent: Jun. 6, 2006

(54) METHOD FOR CONTROLLING THE TRANSMISSION POWER

(75) Inventors: Harri Holma, Espoo (FI); Oscar Salonaho, Helsinki (FI)

(73) Assignee: Nokia Networks Oy, Nokia Group (FI)

( * ) Notice: Subject to any disclaimer, the term of this patent is extended or adjusted under 35 U.S.C. 154(b) by 750 days.

(21) Appl. No.: 09/762,263

(22) PCT Filed: Jun. 22, 2000

(86) PCT No.: PCT/FI00/00561

§ 371 (c)(1),
(2), (4) Date: Mar. 14, 2001

(87) PCT Pub. No.: WO01/01601

PCT Pub. Date: Jan. 4, 2001

(30) Foreign Application Priority Data

Jun. 24, 1999 (FI) .................................. 991448

(51) Int. Cl.
*H04B 7/185* (2006.01)
*H04B 7/216* (2006.01)
*H04B 7/00* (2006.01)
*H04Q 7/00* (2006.01)

(52) U.S. Cl. ............... 370/318; 370/331; 370/335; 370/342; 455/13.4; 455/522

(58) Field of Classification Search ........... 370/318, 370/329, 332, 333, 342
See application file for complete search history.

(56) References Cited

U.S. PATENT DOCUMENTS 6,157,687 A * 12/2000 Ono ........................ 375/347
6,292,519 B1 * 9/2001 Popovic ................... 375/346
6,334,047 B1 * 12/2001 Andersson et al. ........ 455/69
6,337,987 B1 * 1/2002 Agin et al. ............... 455/522
6,337,988 B1 * 1/2002 Agin et al. ............... 455/522
6,374,118 B1 * 4/2002 Toskala et al. ........... 455/522
6,404,826 B1 * 6/2002 Schmidl et al. .......... 375/340
6,542,562 B1 * 4/2003 Ostberg et al. ........... 375/350

(Continued)

FOREIGN PATENT DOCUMENTS

EP 0 853 393 A1 7/1998

(Continued)

OTHER PUBLICATIONS

Seo et al., "*SIR-Based Transmit Power Control of Reverse Link for Coherent DS-CDMA Mobile Radio*", IEICE Trans. Commum., vol. E81-B, No. 7, Jul. 1998, pp. 1508-1516, section 2, 3, 4.

(Continued)

*Primary Examiner*—Hassan Kizou
*Assistant Examiner*—Hong Sol Cho
(74) *Attorney, Agent, or Firm*—Cohen, Pontani, Lieberman & Pavane (57) ABSTRACT

The invention relates to a method (300, 400, 500) for controlling transmission power of a signal which is received using a certain number of rake fingers, where a value for a controlled variable is determined (303, 405) and the controlled variable value is compared (305) to a target value. The method according to the invention is characterized in that a discrepancy for the controlled variable is determined (304) using at least the number of rake fingers used in receiving the signal and said discrepancy is taken into account (305, 312) when comparing the controlled variable value to the target value. The invention relates also to a network element (600) and to a mobile station (610).

22 Claims, 5 Drawing Sheets

U.S. PATENT DOCUMENTS

| | | | |
|---|---|---|---|
| 6,611,512 B1* | 8/2003 | Burns | 370/342 |
| 6,639,934 B1* | 10/2003 | Engstrom et al. | 375/130 |
| 6,760,320 B1* | 7/2004 | Bune | 370/342 |
| 6,947,474 B1* | 9/2005 | Kober et al. | 375/148 |
| 6,975,671 B1* | 12/2005 | Sindhushayana et al. | 375/144 |
| 2001/0030948 A1* | 10/2001 | Tiedemann, Jr. | 370/305 |
| 2002/0151322 A1* | 10/2002 | Agin et al. | 455/522 |
| 2003/0099209 A1* | 5/2003 | Laakso et al. | 370/311 |

FOREIGN PATENT DOCUMENTS

WO    WO 98/58461    12/1998

OTHER PUBLICATIONS

Sampath et al., "*On Setting Reverse Link Target SIR in a CDMA System*", 1997 IEEE, pp. 929-933.

\* cited by examiner

METHOD FOR CONTROLLING THE TRANSMISSION POWER

PRIORITY CLAIM

This is a national stage of PCT application No. PCT/FI00/00561, filed on Jun. 22, 2000. Priority is claimed on patent application No. 991448 filed in Finland on Jun. 24, 1999.

The invention relates in general to controlling the transmission power in cellular networks.

BACKGROUND OF THE INVENTION

In cellular networks it is essential to control the transmission power of the mobile stations as well as the transmission power of the base stations. Effective power control takes care that a base station, for example, receives the signals from various mobile stations with roughly the same intensity. When choosing the transmission power as small as possible, the interference of radio signals is reduced. The limitation is that the lower the received signal power, or actually the signal to noise ratio, the more errors occur. The suitable transmission power is thus in balance between causing interference to other radio transmissions and getting high enough quality for the transmission whose power is controlled.

The transmission power is controlled both in the uplink and in the downlink direction. In the uplink power control, for example, the base station may monitor the power of the received signals, and based on these measurements command the mobile stations to increase or decrease their transmission powers. There are two basic methods to control power: the open loop power control and the closed loop power control. The open loop power control is typically applied to the uplink power control only. Here the mobile station maintains the sum of the received and transmitted power on a constant level. This method can react fast to changes in the power levels, but its precision is poor.

Figure 1:
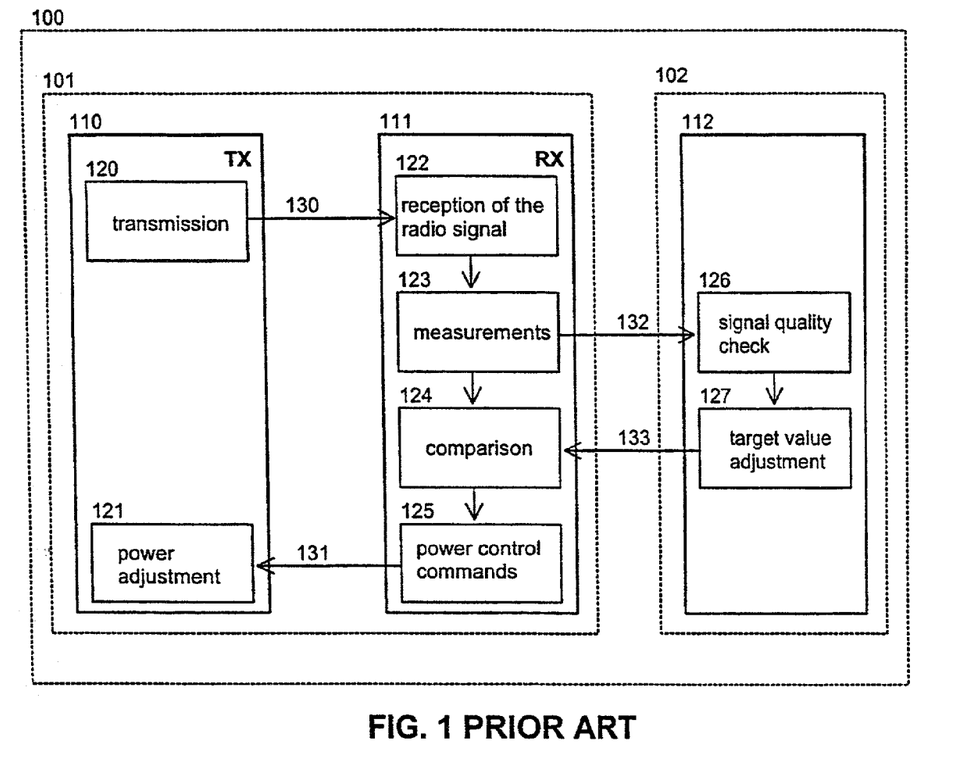
FIG. 1 shows a schematic drawing of a closed loop power control.

FIG. 1 presents an example of the closed loop power control system 100. The close power control system consists of two loops. The inner loop 101 is in FIG. 1 implemented in the transmitter 110 and receiver 111 equipment. A radio signal (arrow 130) is transmitted from the transmitter to the receiver, and it is received in the receiver block 122. In the inner loop of a closed loop power control system usually the signal to interference ratio SIR, is determined and compared to a predetermined target value. This is presented in FIG. 1 with the measurement block 123 and the comparison block 124. The signal power, or other chosen quantity, is sent from the measurement block 123 to the comparison block 124, where the measured quantity is compared to the target value. The target value is chosen so that, for example, the errors in the data transmitted over the radio channel are rare enough. If the signal power is larger than the target value, command to decrease the transmission power is sent from the power control command block 125. If the signal power is too small, the command to increase the power is sent. In the transmitter equipment, the power adjustment block 121 adjusts the transmission power used in the transmission block 120 according to the commands (presented by arrow 130). Usually a predetermined adjustment step is defined, and the power control commands do not indicate how much the power should be increased or decreased.

The outer loop 102 of a closed loop power control system selects the target value for the inner loop. In FIG. 1 the loop is presented to be implemented in a separate network element 112. The outer loop monitors the quality of the received signal. This can be done, for example, by periodically sending frame error rate (FER) values to the outer loop. This is presented in FIG. 1 by arrow 132. The signal quality block 126 checks if the received signal quality is as good as needed. If needed, it adjusts the target value of a controlled variable in the target value adjustment block 127. The setting of a new target value for the controlled variable is presented in FIG. 1 with arrow 133.

In spread spectrum cellular networks, for example in cellular networks that employ CDMA (code division multiple access) radio techniques, all users use the same frequency domain all the time. In CDMA system, each user has a specific code sequence using which his narrow spectrum signal is spread into a signal which uses radio frequencies of a larger bandwidth. The code sequences of different users must be chosen so that they do not correlate and the code sequence of a specific user has to autocorrelate. Those signals that have been spread using a code sequence that correlates with the code sequence used in receiving the seemingly white noise radio transmission are separated. The receiver has to know the transmitters code sequence and the code sequences must be synchronized.

When received in an antenna, the radio signal has components that have been attenuated or delayed in various ways. The radio signals may, for example, scatter, diffract or reflect. This is called multipath propagation, and each of the multipath components has faded in a specific frequency-selective manner and has a specific time delay. In CDMA system, a rake receiver comprises of several correlators (fingers), each of which is tuned to resolve a strong multipath component from the received radio signal. The tuning is done by using a different delay estimation for each finger. By combining these separated multipath components the quality of the signal can be enhanced. The fading in the multipath components is frequency selective and different in each component. A combined signal is thus less faded and its quality is, consequently, better than the quality of the individual multipath components.

Figure 2:
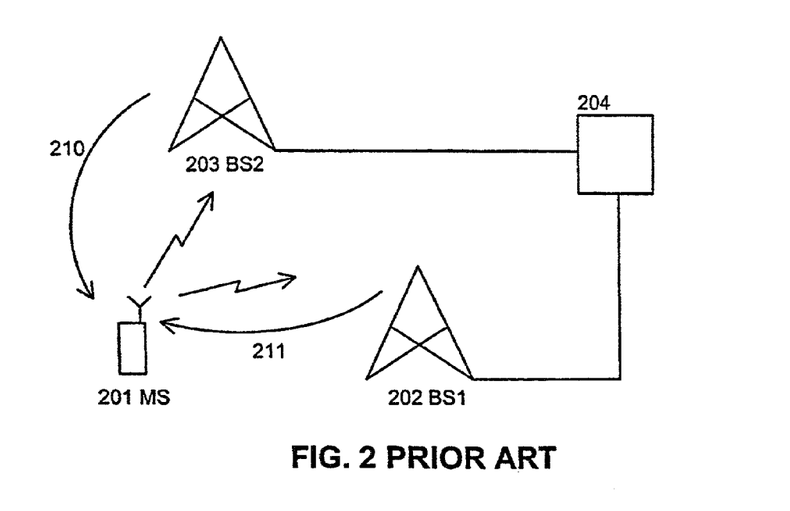
FIG. 2 shows a schematic drawing of power control in a soft handover.

In spread spectrum cellular networks, for example, soft handovers are possible. A soft handover refers to a situation where a mobile station is sending and receiving information related to a certain connection to and from more than one base station simultaneously. An example is presented in FIG. 2, where the radio signal sent by a mobile station 201 is received by the base stations 202 (BS1) and 203 (BS2). Near a cell border, for example, the received signal powers from many base stations can be equal. Soft handover results in a seamless transition from one cell to another. Many base stations may receive the uplink signal sent by a mobile station, and the signals are combined in the cellular network. In FIG. 2, for example, the signals are combined in network element 204. In the downlink direction, the different fingers of a rake receiver in the mobile station may be assigned to different multipath components, which components in this case may arrive from various base stations.

The power control in a soft handover is similar to a situation where the mobile station communicates with only one base station. The difference is that all base stations involved in the handover send uplink power control commands to the mobile station. The mobile station adjusts the transmission power based on these power control commands, which in FIG. 2 are presented with arrows 210 and 211. Usually the logic is such that the transmission power is decreased if at least one of the base stations asks for power down and that power control command can be received reliably enough. The inner loop of the power control involves the mobile station 201 and the base stations BS1 and BS2 and, for example, a radio network controller (RNC) is responsible for setting the target value for the controlled variable.

The controlled variable for power control of radio transmission is preferably the energy per user data bit divided by the equivalent noise density $E_b/N_0$. This factor tells the power of the received signal, and for different connection types the optimal power of the received signal is different. From the signal which carries the user data, however, it is quite difficult to obtain $E_b/N_0$. For example in WCDMA (Wideband-CDMA, a third generation cellular network), there are a dedicated physical control channel (DPCCH) and a dedicated physical data channel (DPDCH) for each connection between a mobile station and the cellular system. The control charnel carries information about the data connection, for example about the bit rate, and the data channel carries the actual user data. A signal to interference ratio (SIR) is usually calculated using the pilot symbols in the control channel DPCCH. The pilot symbols do not change during a connection, so the power signal carrying the pilot symbols is easier to estimate than $E_b/N_0$ from the data channel DPDCH.

The signal to interference ratio SIR can be used as an estimator for $E_b/N_0$ in the power control, but it is a biased estimator. Because the outer loop of the power control adjusts the target value of the controlled variable SIR based on, for example, the frame error rate, it does not matter if the SIR is only proportional to $E_b/N_0$, instead of being equal to it. Only in the beginning of a connection, when an initial target value for the SIR has to be chosen, this may complicate the choice.

A problem is that certain factors affect the size of the bias in SIR compared to $E_b/N_0$. The number of rake fingers used in receiving the signal, for example, affects the signal power estimation. When the bias in the measured SIR value changes, the inner loop of the power control deduces that the actual quality of the received signal changed and starts to alter the transmission power.

The more rake fingers involved in the reception, the better the signal quality and, consequently, the larger the measured SIR value. The release or allocation of rake fingers may change the value of SIR even with 2 dB. For example, when more rake fingers are allocated the SIR value increases in a stepwise manner. The measured value of the controlled variable in the inner loop of the power control thus increases, and the inner loop starts to decrease the transmission power. After the decrease of transmission power the outer loop that monitors the quality of the received signal, for example a frame error rate, notices that the quality of the signal has deteriorated. It decides to increase the target SIR value. The target value is usually increased in steps, and this adjustment of the target value takes time during which the received signal has more errors than usually is acceptable.

If the number of rake fingers involved in receiving the signal is decreased, then the measured SIR value decreases. As a result, the inner loop starts to increase the transmission power. Thereafter the outer loop notices that the received signal quality is better than needed, and it starts to decrease the target value for the controlled variable. The adjustment of the target value takes again some time, and during that time the signal is transmitted with an unnecessary high transmission power. This may cause interference to the other connections thus deteriorating their quality.

Further problems occur in soft handovers, especially in the uplink power control. An optimal situation in a soft handover is that the power control commands sent by each base station involved in the handover affect the transmission power. Unfortunately the base stations involved in the soft handover may use different numbers of rake fingers in receiving the signal from the mobile station. Because the bias in the SIR value depends on the number of rake fingers, a certain target value of the controlled variable does not necessarily result in a situation where all base stations agree that the target value has been reached.

SUMMARY OF THE INVENTION

For example, let us consider a situation where the outer loop of the power control estimates that the target value 8 dB for the controlled variable SIR results in a desired quality for the received signal. Assume that the bias in SIR in a first base station BS1 is, for example, 1 dB and in a second base station BS2 3 dB. Further assume that the actual received SIR in both base stations is roughly the same, for example 5 dB. This assumption is based on the fact that the decision to make a handover is usually based on the signal power and the SIR is proportional to the signal power. In a soft handover, for example when the mobile station is near the cell border, the signal power and thus the SIR is roughly the same in both base station involved in the handover.

In this case, the base station BS1 perceives the quality of the received signal too low (6 dB<8 dB), and therefore asks for increase in the transmission power. The base station BS2, on the other hand, finds the measured SIR, which is 8 dB, just right. If the actual received SIR decreases, the base station BS2 also asks for increase in the transmission power. If the actual received SIR increases but does not exceed 8 dB, the base station BS1 still asks for increase in the transmission power. Only the base station BS2 asks the mobile station to decrease the transmission power. Thus only the base station BS2 actually takes part in the power control, for most of the time the base station BS1 only asks for increased power. The different measured values of SIR may thus deteriorate the power control during soft handovers.

The object of the invention is to present an enhanced, straightforward and easy to implement method for power control. Especially the object is to present a power control method which is insensitive to the number of rake fingers.

The object of the invention is achieved by determining the discrepancy due to the number of rake fingers between the signal power estimator that is used in determining a value for the controlled variable and the corresponding actual physical quantity and by comparing the target value to the controlled variable value in such a way that the discrepancy is canceled out.

A method according to the invention is a method for controlling transmission power of a signal which is received using a certain number of rake fingers, where a value for a controlled variable is determined and the controlled variable value is compared to a target value, and further a discrepancy for the controlled variable value is determined using at least the number of rake fingers used in receiving the signal and said discrepancy is taken into account when comparing the controlled variable value and the target value.

The invention relates also to a network element of a cellular network, which element comprises means for controlling the transmission power of a signal received using a rake receiver using a determined value for a controlled variable, and which element is characterized in that it further comprises means for determining a discrepancy for the determined controlled variable value using at least the number of rake fingers used in receiving the signal and means for taking said discrepancy into account when comparing the determined value for the controlled variable to a target value.

The means for taking the discrepancy into is for example one of the following: means for eliminating said discrepancy from the controlled variable value, means for modifying said target value to comprise said discrepancy.

A mobile station according to the invention, which mobile station comprises a rake receiver and means for controlling the transmission power of a received signal using a determined value for a controlled variable, is characterized in that it further comprises means for determining a discrepancy for the controlled value using at least the number of rake fingers used in receiving the signal and means for taking said discrepancy into account when comparing the determined value for the controlled value to a target value.

The means for taking the discrepancy into account may comprise one of the following: means for eliminating said discrepancy from the controlled variable value, means for modifying said target value to comprise the discrepancy.

In a method according to the invention a value for a controlled variable is determined usually based on the measured properties of the received signal. The measured properties of the received signal may depend on the number of rake fingers that are used to receive the signal. The value for the controlled variable is determined using the measured signal properties and, therefore, the controlled variable value may depend on the number of the rake fingers. If the actual physical properties of the received signal were used instead of the estimates based on measurements, the controlled variable would obtain a different value. In other words, there is a certain discrepancy in the value of the controlled variable.

In the method according to the invention, the discrepancy in the determined value for the controlled variable is determined. The effect of the number of rake fingers on the measured signal properties, and further to the controlled variable value, can be determined, for example, theoretically. When the discrepancy is determined, it is possible to take this discrepancy value into account when comparing the controlled variable value to the target value. The discrepancy is taken into account in the method according to the invention and, consequently, the transmission power control method according to the invention reacts only to actual changes in the signal power. It does not react to changes that are due to, for example, allocation and release of rake fingers. This is the basic advantage of the invention.

Generally, the controlled variable is the signal to interference ratio. The interference estimate and the signal power estimate are determined in order to calculate the signal to interference ratio. The signal power estimate can be determined using, for example, pilot symbols and the interference estimate is determined usually directly from the spread spectrum signal. The signal power estimate depends on the number of the rake fingers, so the determined value of the signal to interference ratio (or other controlled variable) depends also on the number of the rake fingers.

The discrepancy due to the number of rake fingers can be eliminated from the measured value of, for example, the signal power. In this case, the SIR value (or other controlled variable) based on measurement does not change abruptly when rake fingers are allocated or released. The inner loop of the power control keeps also in these situations the transmission power in a constant level, and the outer loop does not have to adjust the target value for the controlled variable. Changes in the antenna configuration do not result in false interpretations of the received signal power. This enhances the power control in both uplink and downlink direction.

It is also possible to modify the target value for the controlled variable, for example, each time the number of rake fingers change. In this case the number of the rake fingers is not used when determining the value for the controlled variable from measurements. When the target value is updated because the quality of the signal is not on a desired level, the target value has to be modified so that the discrepancy between the values of the physical quantities and their estimates is accounted for. If the target value is modified instead of the measured value, the value of both the target value and the measured controlled variable change when, for example, rake fingers are allocated or released. Because both values change in a similar fashion, there is no need to control the transmission power unnecessarily.

A further advantage of the invention is that cancelling out the effect of the number of the rake fingers enhances also the power control in soft handover situations. In uplink direction, even if all the base stations use different number of rake fingers in receiving the signal, the base stations take the effect of the rake fingers into account when comparing determined controlled variable value to the target value. If the receivers are not defected, this canceling out the effect of the rake fingers should result in that the base stations involved in the soft handover have similar results of the signal to interference ratio, for example. Therefore they all contribute to the power control.

Even after the corrections related to the number of rake fingers have been done to the signal power estimate determined from the measurements, it may still be a biased estimator of the user data signal power. For example, when the aim is to control the quality of the user data signal, the SIR value determined from the control channel signal is often used as a controlled variable in the power control instead of the $E_b/N_0$. If the difference between the SIR and the $E_b/N_0$ can be determined, it can also be canceled out. The result is that the controlled variable is an unbiased estimator for $E_b/N_0$.

The aim of power control is to attain an acceptable signal quality with as low transmission power as possible. Using an unbiased controlled variable or a control variable with constant bias makes the choice of the initial target value for the controlled variable easier and more accurate. This can be done, for example, by keeping track on the mean value of SIR corresponding to various signal qualities and setting this mean value as the initial target value. When the number of rake fingers, for example, affects the determined SIR value, the mean values would be accurate only for connections where a certain number of rake fingers is used in reception.

A further advantage of the method accoding to the invention is that there is no need to modify the signalling between the network elements, if the discrepancy in the controlled variable value is determined, for example, in the base station and the discrepancy is taken into account there, too. The signalling messages between the base station and the radio network controller, for example, just contain the target value and each base station interprets the received target value as an unbias target value. The radio network controller, or other entity that sets the target values, does not have to be aware of the possible bias in the determined controlled variable values. In a soft handover situation, for example, a same target value may be sent to all base stations.

On the other hand, it is possible to signal the number of rake fingers from the base stations to the radio network controller, and the radio network controller may calculate for each base station its own target value. In this case the base station specific discrepancies in the controlled variable values are taken into account by modifying the target value to comprise the discrepancies.

BRIEF DESCRIPTION OF THE DRAWINGS

The invention will now be described more in detail with reference to the preferred embodiments by the way of example and to the accompanying drawings where.

DETAILED DESCRIPTION OF THE PRESENT PREFERRED EMBODIMENTS

Above in conjunction with the description of the prior art reference was made to FIGS. 1 and 2. The same reference numerals are used for corresponding parts in the figures.

Figure 3:
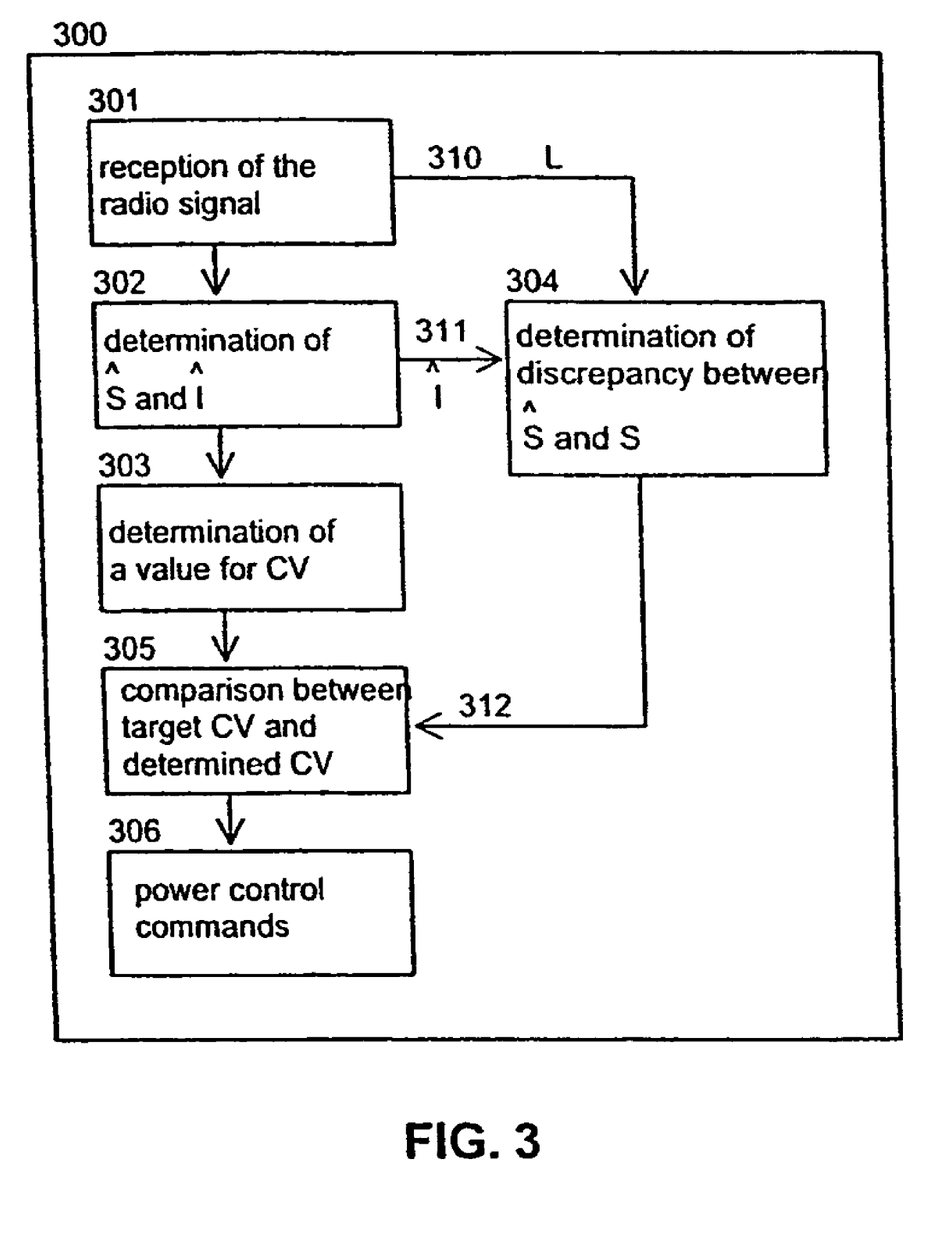
FIG. 3 shows a schematic drawing of a power control method according to a first preferred embodiment of the invention.

A method for controlling transmission power according to the first preferred embodiment of the present invention is presented in a schematic drawing in FIG. 3.

Usually the controlled variable in power control either is the signal power or depends on the signal power. Therefore, in this method the discrepancy between the signal power estimate and the actual signal power is determined.

We shall here use a WCDMA receiver with several rake fingers as an example. The signal is received in the receiver block 301, and the number of rake fingers used in the receiver block 301 is marked with L. In block 302 the signal power estimate is determined. The signal power estimate is determined, for example, from the pilot symbols in the control channel DPCCH. In block 303 a value for the controlled variable CV is determined using the estimated signal power.

In a WCDMA receiver the received signal power S is typically estimated by taking a sum of the average values of the despread samples of each rake finger $$\hat{S} = \sum_{l=1}^{L} \left| a_l + \frac{n}{k} \right|^2.$$

Here the average complex value of the despread samples of the k pilot symbols without any noise is marked with $a_l$, where the sub index l refers to l'th rake finger. Further, the complex despread noise is marked with n. The noise component n is divided by the number of pilot symbols, because the noise is averaged over all the pilot symbols.

The expectation value of the signal power estimate is $$E(\hat{S}) = E\left(\sum_{l=1}^{L} \left| a_l + \frac{n}{k} \right|^2\right) = E\left(\sum_{l=1}^{L} |a_l|^2\right) + LE\left(\left|\frac{n}{k}\right|^2\right) = S + \frac{L}{k^2} E(|n|^2)$$

As the above equation shows, the additive bias in the signal power estimate is proportional to the number of the rake fingers L. When the rake finger number changes, there is an abrupt change in the signal power estimate, although the actual signal power S does not change. The discrepancy between the signal power estimate and the actual signal power is $E(|n|^2)L/k^2$. Because the interference estimate $\hat{I}=|n|^2$ can also be determined in block 302 and the numbers of the rake fingers and the pilot symbols are known, it is possible to determine a correction $-\hat{I}L/k^2$ for the signal power estimate in a correction block 304.

The example above shows how to determine theoretically the discrepancy between the signal power estimate $\hat{S}$ and the actual signal power S. A theoretical formula for the correction is predetermined and the value of the correction is calculated in the correction block 304, when the actual measurements have been done. It is also possible to estimate the discrepancy, for example, by collecting vast number of measurement data using various signal powers, interference levels and rake finger numbers, and to determine a correction function from the results. In this case, the size of the correction is determined from measurements and the correction values can be, for example, inserted into a table. The correction block 304 corresponds here to a table look-up.

The discrepancy needs to be taken into account before the value of the controlled variable is compared to the target value in the comparison block 305. FIG. 3 shows, how the correction term is transmitted to the comparison block (arrow 312). The effect of the number of rake fingers can be, for example, eliminated from the controlled variable value by substituting $\hat{S}$ with $-\hat{I}L/k^2$. This can be done already when calculating the value for the controlled variable in block 303, but in FIG. 3 the determination of the discrepancy is shown explicitly in block 304. It is also possible to modify the target value so that the discrepancy is taken into account there.

After the comparison, the power command block 306 informs the transmitter to increase or decrease the transmission power, for example by sending power control commands.

A method for controlling transmission power according to a second preferred embodiment of the present invention eliminates the discrepancy due to the number of the rake fingers from the controlled variable value. The signal to interference ratio SIR, where the signal power is determined from the pilot symbols in the control channel DPCCH, is used here as en example of a controlled variable in the power control.

To eliminate the discrepancy between the signal power estimate and the actual signal power, the signal to interference ratio is determined by the following way $$SIR^* = \frac{S}{I} = \frac{\sum_{i=1}^{L}|a_i|^2}{I} = \frac{\hat{S} - \frac{L}{k^2}\hat{I}}{\hat{I}} = \frac{\hat{S}}{\hat{I}} - \frac{L}{k^2} = SIR - \frac{L}{k^2}.$$

This rake finger number independent SIR*, where the effect of the rake fingers is subtracted from the signal power estimate, follows the actual changes in the received signal power of the pilot symbols compared to the interference. Any allocations or releases of the rake fingers do not change the SIR* value. When SIR* is used in power control as the controlled variable, the power control works as planned in soft handover situations or when changing the number of the rake fingers. The entity setting the target level for the controlled variable does not need to know the size of the correction term or even that any correction is done. Note that in the above formula the SIR values are not expressed in dB.

The signal to interference ratio SIR* presented above is, however, still a biased estimate for the $E_b/N_0$ ratio. Although the effect of the number of the rake fingers has been canceled out, there is still the bias inherent to the fact that the SIR* is calculated from the control channel DPCCH and the aim of the power control is to attain a proper value for $E_b/N_0$ which is related to the user data channel DPDCH.

If SIR* is used as a controlled variable in the power control, the cellular network may choose the initial target value for a connection by checking what has been a typical target value in similar connections. The cellular network may, for example, keep a table where for each connection type an average target value for SIR* is stored. The bias in SIR* compared to $E_b/N_0$ is the same for all connection of the same connection type. The values in the table may be, for example, average of the target values in a certain number of similar connections.

Figure 4:
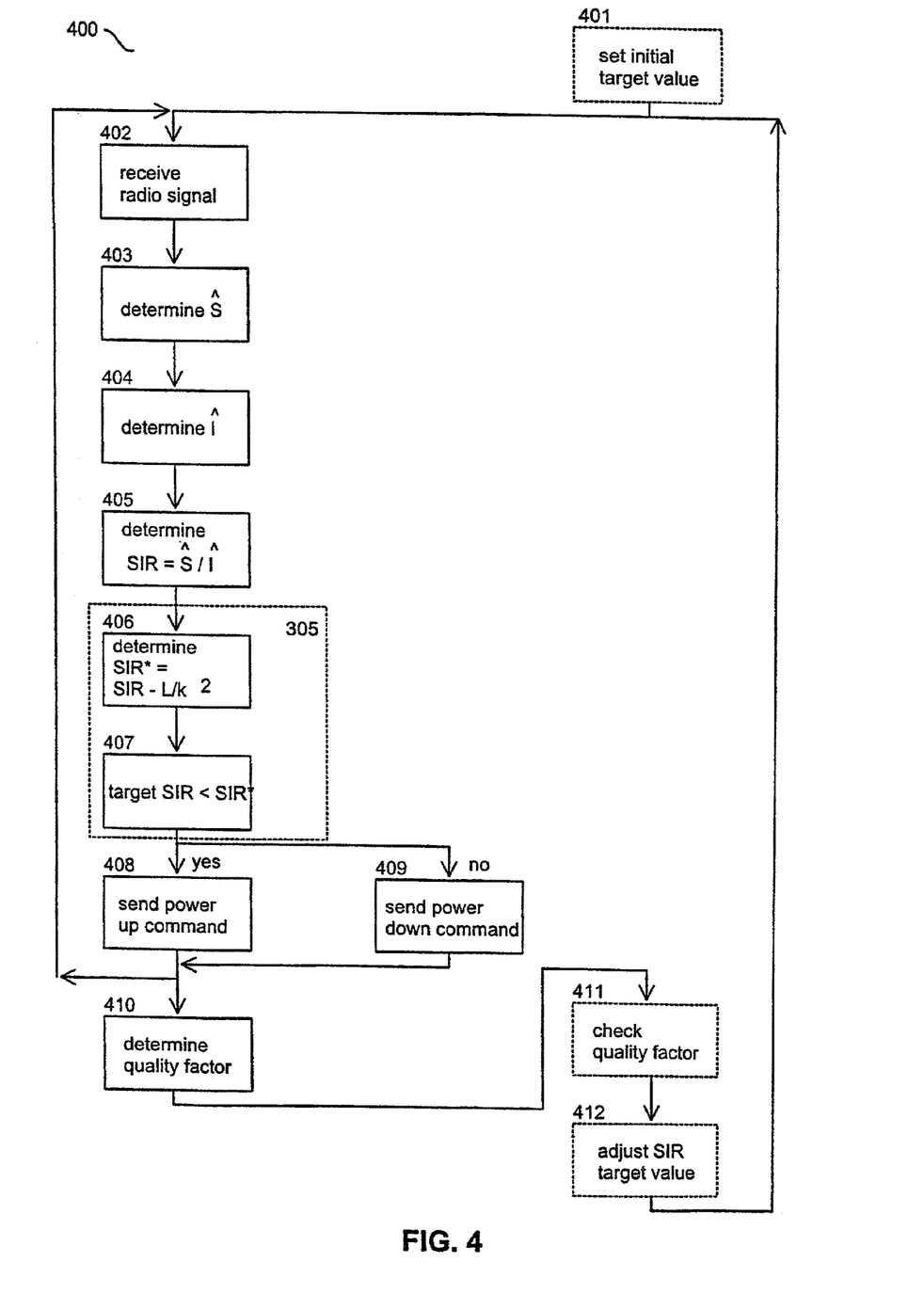
FIG. 4 shows a flowchart of a power control method according to a second preferred embodiment of the invention.

FIG. 4 shows a flowchart that presents an exemplary power control method 400 according to this second preferred embodiment of the invention. The control method presented in FIG. 4 uses closed loop control, and in the flowchart the inner loop steps are presented using solid line frames and the outer loop steps using dashed line frames.

In the first step 401 an initial target value $SIR_{target}$ for the control parameter is set. This value is, for example, set by the outer loop of the power control. In step 402 the radio signal carrying the control channel data is received using L rake fingers and in step 403 the signal power estimate $\hat{S}$ related to k pilot symbols is determined from the received signal. In step 404 the interference estimate $\hat{I}$ is determined. In step 405 the signal to interference ratio is determined using the signal power estimate $\hat{S}$ and the interference estimate $\hat{I}$.

In step 406 the correction for the signal power is taken into account by subtracting the term $L/k^2$ from the SIR value determined in step 405. The result is the measured $SIR^*_{meas}$ which reflects actual changes in the signal to interference ratio. The number of rake fingers used to received the radio signal does not affect the value of $SIR^*_{meas}$. In step 407 the measured SIR* value is compared to the initial target value. As FIG. 4 shows, the step 406 and 407 correspond to the comparison block 305 in FIG. 3.

In step 408, if the measured value is larger, a control command to reduce the transmission power is sent. If the measured value is smaller than the target, in step 409 a control command to reduce the transmission power is sent. After sending the power control commands, the a factor related to the quality of the received signal, for example the frame error rate, is sent to the outer loop of the power control in step 410. This value may be sent every time the measured SIR* value is calculated or less frequently. If the quality factor is not sent to the outer loop each time, then the inner loop goes back to step 402 after sending the power control command.

In step 411 the outer loop of the power control compares the measured quality factor to the desired value. In step 412 is adjusts the target value $SIR_{target}$. If the measured quality of the received signal is too poor, the target value is increased and, if it is unnecessary high, the target value is decreased.

Figure 5:
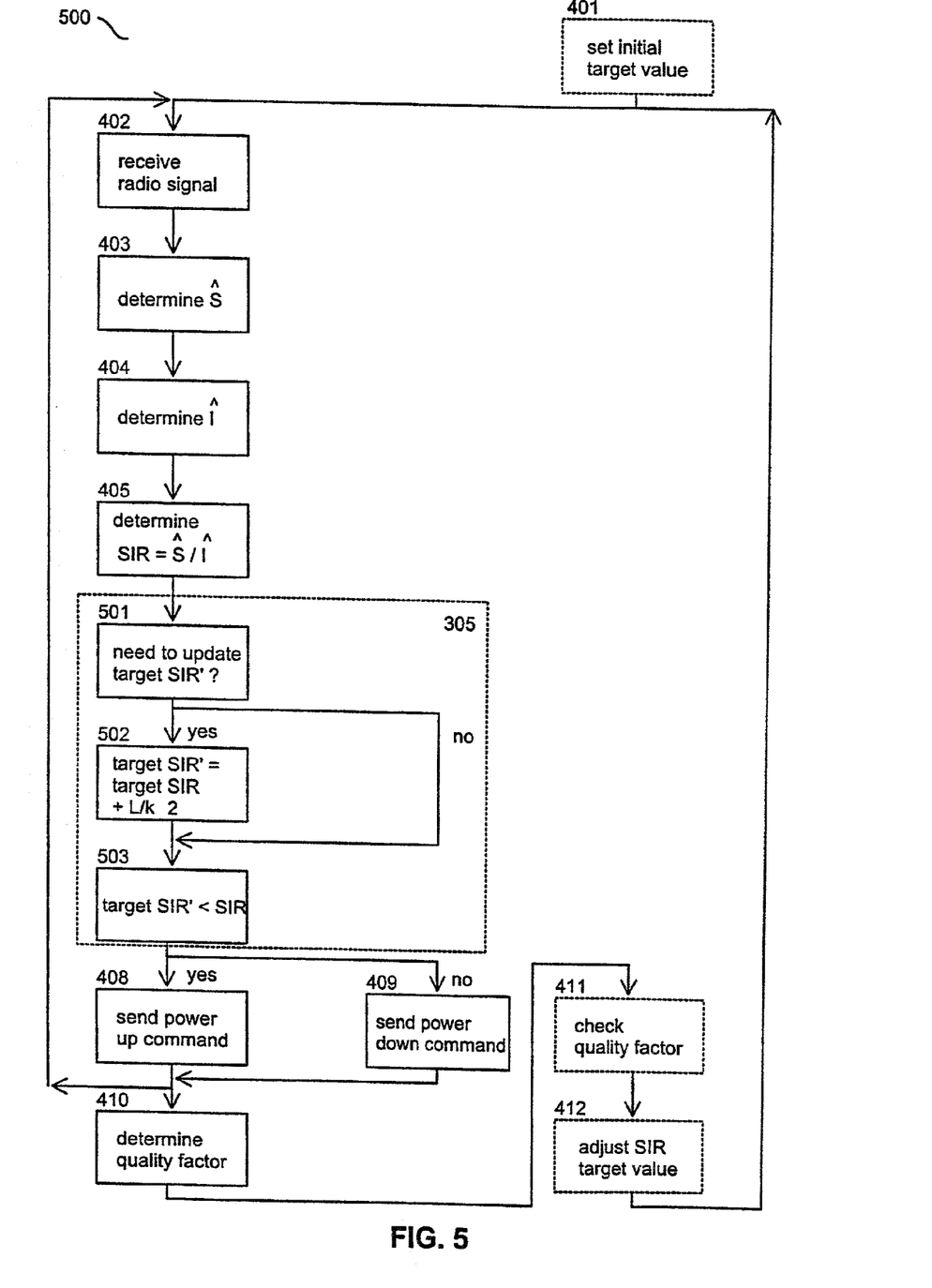
FIG. 5 shows a flowchart of a power control method according to a third preferred embodiment of the invention.

It is also possible to modify the target value set for the controlled variable so that it takes into account the number of rake fingers used in receiving the signal. This is done in a method according to a third preferred embodiment of the invention. Here the signal to interference ratio is again used as an example of a controlled variable. The outer loop of the power control sets a target value for the $SIR_{target}$. If the target value is modified in the following way $$SIR'_{target} = SIR_{target} + \frac{L}{k^2}$$

then the signal power estimate $\hat{S}$ can be used when the measured SIR is determined, $SIR_{meas} = \hat{S}/\hat{I}$. Note that in the above formula the $SIR_{target}$ values are not expressed in dB.

In a method according to this third preferred embodiment of the invention, the target value for the controlled variable has to be updated from $SIR_{target}$ to $SIR'_{target}$ each time a new target value is set and each time the number of rake fingers used in receiving the radio signal changes.

FIG. 5 presents a flowchart of a power control method 500 according to the third preferred embodiment of the invention. Again a closed loop power control method is used as an example of the power control method. The power control method presented in FIG. 5 starts similarly as the method presented in FIG. 4. The initial target value for the controlled variable is set in step 401. In step 402 the radio signal is received, and in steps 403 and 404 the signal power estimate of the k pilot symbols $\hat{S}$ and the interference estimate $\hat{I}$ are determined. In step 405 the signal to interference ratio is determined by $SIR_{meas} = \hat{S}/\hat{I}$.

In step 501 it is checked if there is need to update the $SIR'_{target}$ value. This value has to be updated at least each time a new target value $SIR_{target}$ is set by the outer loop or when the number of rake fingers used in receiving the signal has changed. In step 502 a new modified target value $SIR_{target}$ is calculated. Otherwise the old modified target value is still valid, and in step 503 the measured $SIR_{meas}$ is compared to the target value $SIR'_{target}$. As shown in FIG. 5, the steps 501, 502 and 503 correspond to the comparison block 305 in FIG. 3.

The power control commands are sent in steps 408 and 409. After this comparison the method continues to adjust the target value in steps 410–412, like in the method presented in FIG. 4.

In some cases it may be more convenient to use the ratio $E_b/N_0$ as the controlled parameter. A method according to a fourth preferred embodiment of the invention takes into account also the difference between the signal power of the pilot symbols in the DPCCH channel and the data in the DPDCH channel. The relation between the SIR* and $E_b/N_0$ can be written as $$SIR^* = A \frac{E_b}{N_0}.$$

The coefficient $A = A_{CC} A_{PD} A_{PG}$ depends on the type of the connection and on the user data bit rate. Term $A_{CC}$ takes into account the effect of the channel coding which is in use in the data channel. $A_{CC}$ is the ratio of the user data bit rate and the DPDCH bit rate, which in WCDMA, for example, is 4096 kbps. Term $A_{PD}$ is equal to the relative transmission power of the control channel compared to the total transmission power of the control and the data channel. In CDMA systems term $G_{DPCCH}$ usually presents the relative transmission power of the control channel compared to the data channel transmission power, and thus $A_{PD}$ is $$A_{PD} = \frac{G_{DPCCH}}{1 + G_{DPCCH}}.$$

Term $A_{PG}$ takes into account the processing gain of the pilot symbol group. It is the product of the spreading factor and the number of the pilot symbols k. In WCDMA, for example, the spreading factor for the control channel DPCCH is 256.

In a method according to the fourth preferred embodiment of the invention the controlled variable in the power control can be, for example, the quantity $SIR^*/A$. This is an unbiased estimator for $E_b/N_0$. It is also possible, in a manner similar to that used in the third preferred embodiment of the invention, to modify the target value by multiplying with A.

In a method according to a fifth preferred embodiment of the invention, the estimate for the interference is corrected in addition to the correction done to the signal power estimate. The interference power is generally determined from the spread spectrum signal, and this signal comprises also the signal that is sent to the receiver. A more accurate interference estimate is obtained, if the actual signal power S of the received signal is removed from the interference determined from the spread spectrum signal.

The interference estimate $\hat{I}$ determined from the spread spectrum signal is thus $\hat{I} = I + S$, where I and S are the actual interference and signal power. From the equations $$\begin{cases} \hat{I} = I + S \\ \hat{S} = S + IL/k^2 \end{cases}$$

it is possible to resolve S and I resulting in $$\begin{cases} I = \frac{\hat{I} - \hat{S}}{1 - L/k^2} \\ S = \frac{\hat{S} - \hat{I}L/k^2}{1 - L/k^2} \end{cases}.$$

The controlled variable value is calculated using these I and S or the target value is updated so that it takes into account the discrepancy between the actual values of I and S and the estimates $\hat{I}$ and $\hat{S}$. If the controlled variable in the power control is, for example, the signal to interference ratio, an unbiased value $SIR^*$ is obtained from the following formula $$SIR^* = \frac{\hat{S} - \hat{I}L/k^2}{\hat{I} - \hat{S}}.$$

By substituting this formula to the step 406 in method 400, the method 400 becomes a method according to the fifth preferred embodiment of the invention.

The same unbiased value for $SIR^*$ is obtained, if the actual signal power S and the actual interference I are approximated using $$\begin{cases} I \approx \hat{I} - \hat{S} \\ S \approx \hat{S} - \hat{I}L/k^2 \end{cases}.$$

Both these value are biased with factor $(1-L/k)^{-1}$, which is canceled out when the SIR is calculated. If the controlled variable is not SIR but some other function of S and I, this approximation does not necessarily yield an unbiased value for the controlled variable.

The bias in the interference estimate depends on the bit rate of the received signal. For speech services, there is probably no need to take the bias into account. For services where data is transmitted with rates of more than 500 kbps, it is advisable to separate the received signal power from the interference estimate.

Figure 6:
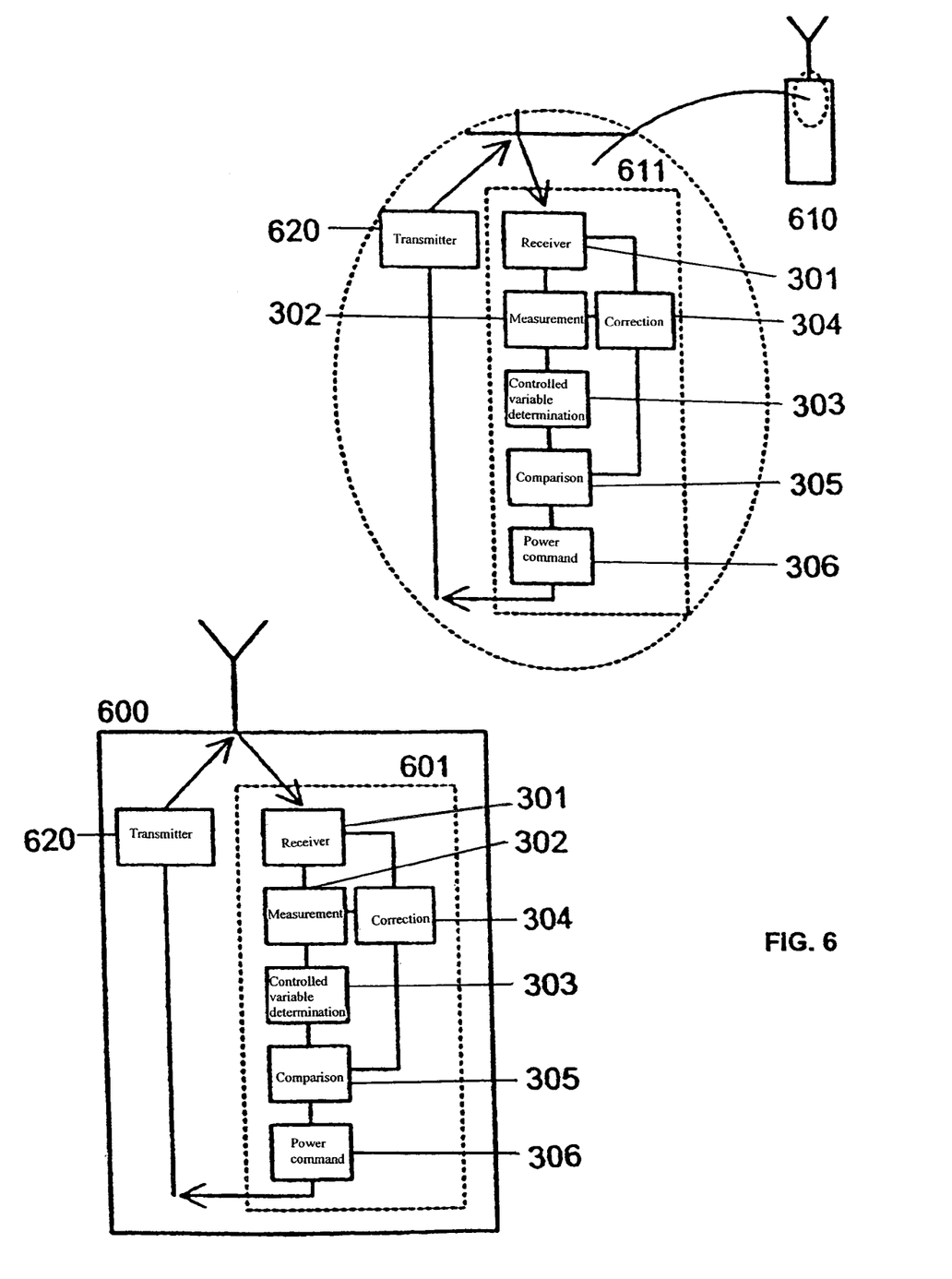
FIG. 6 shows a schematic drawing of a network element and a mobile phone, where methods according to any preferred embodiment of the invention have been implemented.

FIG. 6 presents a cellular network element 600 which comprises a power control arrangement 601 according to any preferred embodiment of the invention. The cellular network element controls the uplink transmission power of a mobile station 610. As an example, power control arrangement 601 in the network element 600 presented in FIG. 6 comprise blocks according to the first preferred embodiment of the invention. The radio signal receiver block 301 is in charge of receiving the signal. The measurement block 302 is in charge of measuring the received signal power, the interference and any other necessary quantities. A value for the controlled variable is determined in block 303 and the controlled variable value is compared to the target value in the comparison block 305. The discrepancy between the signal power estimate and the actual signal power is determined in correction block 304. According to the comparison, the power command block 306 constructs a command for increasing or decreasing the transmission power. The command is sent to the transmitter block 620 which is in charge of the radio transmission. The blocks may be implemented using, for example, microprocessors and a suitable program code.

The network element 600 may be a base station, and target values of the controlled variable may be determined in the cellular network, for example by the RNC in a WCDMA network. If the base stations involved in a soft handover, for example, employ a method according to invention for canceling out the effect of the number of rake fingers used in receiving the signal, they all contribute to the uplink power control during the soft handover It is not necessary that a base station comprises the transmission power control arrangement, it can be situated in some other network element of the cellular network, too. Not having the transmission power control arrangement in the base station, however, increases the signaling needs between the base station and the network element in charge of the uplink power control.

It is also possible that the mobile station 610 uses a power control arrangement 611 according to some preferred embodiment of the invention. In this case, when the number of rake fingers, which the mobile station uses for receiving the radio signal related to a certain connection, changes, the mobile does not send unnecessary power control commands to the cellular network. A mobile station comprising a power control arrangement 611 according to the first preferred embodiment of the invention is presented as an example in FIG. 6.

Above the WCDMA has been used only as an example of a cellular network where the radio access network employs spread spectrum techniques. It does not restrict the methods according to the invention to be used only in WCDMA networks. The methods according to the invention may be applicable in any other cellular network where spread spectrum techniques are employed.

The CDMA system has been used as an example of a spread spectrum technique. The methods according to the invention are not restricted to those using the CDMA technique.

The signal to interference ratio has been used as an example of the controlled variable in power control methods. This does not restrict the scope of the invention, and the methods according to the invention may use any suitable controlled variable. The power control methods presented here have been closed loop methods, but a method according to the invention does not have to be a closed loop power control method. The essential thing is that a value is determined for a controlled variable based on measurements and this value is compared to a target value. The invention does not restrict the choice of the controlled variable or the target value.

What is claimed is:

1. A method for controlling transmission power of a signal which is received using a number of rake fingers, said method comprising the steps of:
   determining a value for a controlled variable;
   comparing the controlled variable value to a target value;
   determining a discrepancy for the controlled variable value based on information that includes at least the number of rake fingers used in receiving the signal; and
   taking into account said discrepancy when comparing the controlled variable value to the target value.

2. The method of claim 1, further comprising the steps of:
   determining a signal power estimate using a certain part of the radio signal; and
   determining an interference estimate;
   wherein the value for a controlled variable is determined using said signal power estimate and said interference estimate.

3. The method of claim 2, wherein:
   determining a first discrepancy between said signal power estimate and the actual signal power is determined using at least the number of rake fingers and the interference estimate;
   a second discrepancy between said interference estimate and the actual interference is determined using at least said signal power estimate; and
   both discrepancies are taken into account when comparing the controlled variable value to the target value.

4. The method of claim 2, wherein the discrepancy depends on the value of the controlled variable.

5. The method of claim 1, wherein the discrepancy depends on the value of the controlled variable.

6. The method of claim 1, wherein the discrepancy is eliminated from the controlled variable value.

7. The method of claim 1, wherein said target value is modified to comprise said discrepancy.

8. The method of claim 1, wherein the signal to interference ratio is used as the controlled variable.

9. The method of claim 1, wherein the method is a closed loop power control method.

10. The method of claim 1, wherein the initial target value is the same for all connections used to carry a certain service.

11. The method of claim 1, wherein:
    more than one receiver is receiving the signal;
    in each receiver a receiver-specific value for the controlled variable is determined;
    the discrepancy is determined for each receiver; and
    the receiver-specific discrepancies are taken into account in comparing the receiver-specific controlled variable value to the target value.

12. The method of claim 11, further comprising the step of:
    sending a same target value to all the receivers; and
    wherein the receiver-specific discrepancies are taken into account in each receiver.

13. A network element of a cellular network, said network element comprising:
    means for controlling the transmission power of a signal received using a rake receiver using a determined value of a controlled variable;
    means for determining a discrepancy for the determined controlled variable value based on information that includes at least a number of rake fingers used in receiving the signal; and
    means for taking the discrepancy into account when comparing the controlled variable value to a target value.

14. The network element of claim 13, wherein the means for taking the discrepancy into account comprise one of the following: means for eliminating said discrepancy from the controlled variable value, and means for modifying said target value to comprise said discrepancy.

15. The network element of claim 13, said network element further comprising:
    means for determining a signal power estimate of a certain part of the received signal; and
    means for determining an interference estimate.

16. The network element of claim 13, wherein said network element is a base station.

17. The network element of claim 16, wherein said network element is a base station of a WCDMA network.

18. The network element of claim 13, wherein said network element is a radio network controller of a WCDMA network.

19. A mobile station comprising:
    a rake receiver;
    means for controlling the transmission power of a received signal using a determined value for a controlled variable;
    means for determining a discrepancy for the controlled variable value based on information that includes at least a number of rake fingers used in receiving the signal; and
    means for taking said discrepancy into account when comparing the controlled variable value to a target value.

20. The mobile station of claim 19, wherein the means for taking the discrepancy into account comprise one of the following: means for eliminating said discrepancy from the controlled variable value, and means for modifying said target value to comprise said discrepancy.

21. The mobile station of claim 19, said mobile station further comprising:

means for determining a signal power estimate of a certain part of the received signal; and
means for determining an interference estimate.

22. The mobile station of claim 19, wherein said mobile station is a mobile station of a WCDMA network.

* * * * *